Patented July 18, 1933

1,918,893

UNITED STATES PATENT OFFICE

HERMANN BECKMANN, OF BERLIN-ZEHLENDORF, GERMANY

POROUS BODY

No Drawing. Application filed February 14, 1929, Serial No. 340,028, and in Germany February 17, 1928.

My invention refers to a new article of manufacture constituting a body of high porosity and being composed of at least two components viz. a solid micro-porous material acting as a binder and another material, which may be porous or non-porous and the particles of which are bound by the said binder.

It is an object of my invention to provide a porous body which has favorable physical and chemical properties distinguishing same favorably from similar products hitherto made and used.

As is well known to those skilled in the art if it is desired to manufacture porous bodies from granular or other solid materials, difficulties are encountered in forming such bodies into plates or the like inasmuch as the materials in question, such as for instance porous carbon, silica gel, kieselguhr and the like cannot be moulded even under heavy pressure because the single particles do not adhere to one another. On the other hand if these materials are moulded with the aid of a binder, such as for instance waterglass or rubber solution, these binders, which on drying or solidifying form a non-permeable layer or coating, will clog the pores in and between the particles of the material to be moulded.

I have now ascertained that all these drawbacks are avoided and materials of substantially any description can be converted into mouldable masses of high porosity, if micro-porous rubber is admixed with them to act as a binder.

In the specification of my Patent No. 1,745,657, I have described a new rubber product obtained by converting a latex into a jelly-like mass and curing (as by vulcanization) the rubber constituent thereof, while the water constituent is retained, so that after cure the rubber, though its physical properties have been changed in the manner well known to result from a cure, retains the structural form of volumetric distribution, which it assumed as an incident to the formation of a jelly. The rubber product obtained in this manner is permeated with pores of microscopic dimensions which impart to the rubber a capillary structure highly absorbent of and permeable for liquids.

This rubber product combines high porosity with mechanical strength and high resistivity to chemical influences. If the cure, for instance the vulcanization, is effected while other materials, for instance granules, are admixed with the rubber forming material, the rubber formed as a result of the cure will constitute a powerful binder. If the mixture contains for instance carbon, silica gel, kieselguhr, fibrous materials or the like, the rubber produced after curing will cement the granules or fibres with each other, without however impairing the porosity of the composite body thus formed, for the interstices between the granules or fibres are not filled up with an impermeable substance, but with a substance of extremely high porosity and the same is true of the rubber coating surrounding the granules or fibres. Therefore a porous body is thus obtained which will present either high chemical resistivity or high chemical efficiency or both.

For instance in order to produce bodies as above mentioned, the granular or fibrous material (aggregate) is mixed with a comparatively small quantity of a latex (matrix or binder), the quantities being for instance chosen in such manner that the finished product contains not substantially more than about 15% rubber. The aggregate thus constitutes the major portion by volume of the porous articles and is used in amount sufficient to impart its character to the said articles. To the mixture is also added a quantity of sulphur which suffices for vulcanization. By adding a suitable coagulation agent, for instance a salt, as described more fully in my acknowledged patent aforementioned, a caoutchouc jelly is formed which permeates the mass in the form of a colloidal net, in which the water constituent of the latex is enmeshed. This mass may then be introduced into suitable moulds and is vulcanized in moist condition in the presence of saturated steam or under water. In certain cases it will prove useful to subject the body either before or after vulcanization to pressure in order to expel the water in excess and to simultaneously reinforce the structure of the body itself.

In this manner a great number of more or less porous materials, such as for instance porous coal or carbon, pumice stone, infusorial earth, silica gel, wood meal, leather meal, cork meal or granules formed of these materials, powdered clay, flour, asbestos powder and the like, furthermore fibrous materials, such as for instance peat, paper pulp, paper, cotton, wool, jute, hemp, silk, both natural and artificial, glass wool, metal wool and the like can be converted into mouldable masses which after having gone through the process of cementation aforementioned will constitute highly porous and highly resistive bodies. In some cases it may prove useful also to mould in this manner porous metals or pieces of metal sponges, such as spongy lead, platinum or the like. Non-porous substances, such as powdered graphite, metal powder or the like may be moulded in this manner or be incorporated in the above-mentioned mixtures. I may also render mouldable non-porous powders, such as metal powder and in this case I obtain a body having a perfect metallic structure, but being traversed by microscopic pores.

Porous bodies of the kind aforesaid are adapted for various technical uses. Thus for instance bodies formed of long fibres are particularly adapted for use as filter plates, as diaphragms for electrolytical processes, as absorbing and adsorbing plates. For instance if silica gel is cemented together by means by micro-porous rubber, plates can be formed which present a remarkable surface action. Carbon plates can be produced in a similar manner from highly porous active carbon.

The porous bodies according to this invention are further adapted for use as heat-insulating materials, or may be used for lubricating pads, the pores being filled with lubricating liquids. If desired graphite may be introduced into the bodies.

Micro-porous plates consisting of spongy lead or platinum can be produced. Bearing brasses can be formed consisting of metal cemented together by the micro-porous net which allows introducing lubricant right across the bearing body. Micro-porous containers of any description can also be produced in this manner.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. As a new material for filtering liquids, a highly porous body comprising a finely divided aggregate dispersed in a porous matrix in the form of a cured, colloidal rubber net of reticulate structure having microscopically visible, filter-size pores; the said aggregate constituting the major portion by volume of the said article and being sufficient in amount to impart its character to the said article.

2. The product of claim 1 wherein the said aggregate is of porous material.

3. The product of claim 1 wherein the matrix constitutes not substantially more than about 15 per cent by weight of the said article.

4. The product of claim 1 wherein the said finely divided aggregate is a granular body selected from a class consisting of metal sponges, spongy lead, spongy platinum, graphite, carbon, silica gel, infusorial earth, pumice stone, wood meal, leather meal, cork meal, powdered clay and asbestos powder.

5. The product of claim 1 wherein the said finely divided aggregate is a fibrous material selected from a class consisting of peat, paper pulp, paper, cotton, wool, jute, hemp, silk, glass wool and metal wool.

6. The product of claim 1 wherein the said aggregate is a metallic substance selected from a class consisting of finely divided metals and brasses.

HERMANN BECKMANN.